(12) United States Patent
Higuchi et al.

(10) Patent No.: US 7,655,716 B2
(45) Date of Patent: Feb. 2, 2010

(54) SOLUTION CONTAINING FLAME-RESISTANT POLYMER AND CARBON MOLDING

(75) Inventors: Tetsunori Higuchi, Iyo-gun (JP);
Katsumi Yamasaki, Iyo-gun (JP);
Koichi Yamaoka, Matsuyama (JP);
Tomihiro Ishida, Iyo-gun (JP)

(73) Assignee: Toray Industries, Inc. (JP)

( * ) Notice: Subject to any disclaimer, the term of this patent is extended or adjusted under 35 U.S.C. 154(b) by 259 days.

(21) Appl. No.: 10/590,004

(22) PCT Filed: Feb. 18, 2005

(86) PCT No.: PCT/JP2005/002564

§ 371 (c)(1),
(2), (4) Date: Aug. 21, 2006

(87) PCT Pub. No.: WO2005/080448

PCT Pub. Date: Sep. 1, 2005

(65) Prior Publication Data

US 2007/0142515 A1    Jun. 21, 2007

(30) Foreign Application Priority Data

Feb. 20, 2004 (JP) ............ 2004-044074
Sep. 13, 2004 (JP) ............ 2004-265269

(51) Int. Cl.
*C08K 5/00* (2006.01)
(52) U.S. Cl. ............ 524/236; 264/182; 264/29
(58) Field of Classification Search ............ 524/186, 524/236; 264/29, 182
See application file for complete search history.

(56) References Cited

U.S. PATENT DOCUMENTS

| | | | |
|---|---|---|---|
| 3,382,207 A | | 5/1968 | Jaquiss et al. |
| 3,647,769 A | | 3/1972 | Bufton et al. |
| 3,900,285 A | * | 8/1975 | Ono et al. ............ 8/115.54 |
| 3,923,950 A | * | 12/1975 | Gump et al. ............ 264/182 |
| 4,584,103 A | | 4/1986 | Linder et al. |
| 4,644,066 A | * | 2/1987 | Sonnenberg ............ 548/462 |
| 4,661,336 A | | 4/1987 | McCabe |
| 5,314,950 A | * | 5/1994 | Singh et al. ............ 525/73 |
| 2003/0158309 A1 | * | 8/2003 | Ono et al. ............ 524/261 |
| 2003/0166812 A1 | * | 9/2003 | Taniguchi et al. ............ 526/274 |

FOREIGN PATENT DOCUMENTS

| | | |
|---|---|---|
| EP | 1411070 | 4/2004 |
| GB | 601390 | 5/1948 |
| JP | 48-45697 A | 5/1973 |
| JP | 49-41698 | 4/1974 |
| JP | 49-41698 A | 4/1974 |
| JP | 49-54631 | 5/1974 |
| JP | 49-54631 A | 5/1974 |
| JP | 52-59799 | 5/1977 |
| JP | 52-59799 A | 5/1977 |
| JP | 52-63428 | 5/1977 |
| JP | 52-63428 A | 5/1977 |
| JP | 62-57723 | 12/1987 |
| JP | 63-14093 | 3/1988 |
| JP | 2636509 | 4/1997 |
| JP | 2004-3043 A | 1/2004 |
| WO | 03008474 | 1/2003 |

OTHER PUBLICATIONS

Wen-Yen Chiang and Chun-Min Hu, "Studies of Reactions with Polymers. VI. The Modification of PAN with Primary Amines" "*Journal of Polymer Science: Part A: Polymer Chemistry*", vol. 28, p. 1623-1636 (1990).

N.A. Kubasova, M.V. Shishkina, N.F. Zaliznaya and M.A. Geiderikh, "Thermal Conversion of Polyacrylonitrile (PAN) in Solution", p. 1537-1542 (1967).

* cited by examiner

*Primary Examiner*—Timothy J. Kugel
*Assistant Examiner*—Atnaf Admasu
(74) *Attorney, Agent, or Firm*—DLA Piper LLP (US)

(57) ABSTRACT

A flame-resistant polymer excelling in moldability capable of providing a flame-resistant molded item of novel configuration; a relevant flame-resistant polymer solution; a process for easily producing them; a carbon molding from the flame-resistant polymer; and a process for easily producing the same. There is provided a flame-resistant polymer modified with an amine compound. Further, there is provided a flame-resistant polymer solution in which the polymer is dissolved in a polar organic solvent. Still further, there is provided a flame-resistant molding whose part or entirety is constituted of the flame-resistant polymer modified with an amine compound. Moreover, there is provided a carbon molding whose part or entirety is constituted of a carbon component resulting from carbonization of the flame-resistant polymer modified with an amine compound. Still further, there is provided a process for producing them. From the solution containing the flame-resistant polymer, moldings of various configurations can be obtained through further work.

14 Claims, 2 Drawing Sheets

SOLUTION CONTAINING FLAME-RESISTANT POLYMER AND CARBON MOLDING

RELATED APPLICATION

This is a §371 of International Application No. PCT/JP2005/002564, with an international filing date of Feb. 18, 2005 (WO 2005/080448 A1, published Sep. 1, 2005), which is based on Japanese Patent Application Nos.2004-044074, filed Feb. 20, 2004, and 2004-265269, filed Sep. 13, 2004.

TECHNICAL FIELD

The present invention relates to a flame-resistant polymer and a solution containing a flame-resistant polymer, and more particularly to a flame-resistant polymer appropriate for obtaining a flame-resistant formed product and the like, a flame-resistant polymer-containing solution and a manufacturing method thereof.

The invention further relates to a flame-resistant formed product, a carbon moldedproduct comprising the above-mentioned flame-resistant polymer and a manufacturing method thereof.

BACKGROUND ART

Flame-resistant fiber is so excellent in heat resistance and flame retardance as to be widely utilized, for example, for spatter sheets for protecting the human body from high-heat iron powder and weld spark, which scatter in welding operation, and fire-resistant heat insulators for aircrafts, leading to an increasing demand in the fields.

Flame-resistant fiber is important also as intermediate raw materials for obtaining carbon fiber. The carbon fiber has such mechanical, chemical properties and lightweight properties as to be widely used for various uses, for example, materials for aviation and space such as aircrafts and rockets, and sporting goods such as tennis rackets, golf shafts and fishing rods, and to be going to be used also in fields for transport machines such as vessels and automobiles. In recent years, the carbon fiber has so high electrical conductivity and heat radiation as to be strongly required for application to electronic equipment parts such as portable telephones and personal computer cabinets, and electrodes of fuel cells.

The carbon fiber is generally obtained by a method of carbonizing flame-resistant fiber by heating at high temperature in an inert gas such as nitrogen. With regard to flame-resistant fiber, for example, polyacrylonitrile (PAN)-based flame-resistant fiber is obtained by making PAN-based precursor fiber flame-resistant (cyclization reaction and oxidation reaction of PAN) at a high temperature of 200 to 300° C. in the air.

However, this reaction for making flame-resistant is an exothermic reaction and a reaction in a fibrous form, namely, a solid-phase state. Therefore, long-time treatment is required for temperature control, and the degree of fineness of PAN-based precursor fiber needs to be limited to fine size below specific value for finishing making flame-resistant within desired time. Thus, the presently known process of making flame-resistant is regarded with difficulty as a sufficiently efficient process.

With regard to flame-resistant products, it is substantially difficult to obtain flame-resistant formed products in the form except fiber, such as plane shapes of sheet and film and various cubic shapes, due to the difficulty of heat removal for the reason that the reaction for making flame-resistant is an exothermic reaction as described above. Accordingly, flame-resistant formed products are limited to fibreform products, and in the present circumstances, plane sheets are manufactured by making such fibreform products into fabrics.

When flame-resistant fiber with optional degree of fineness and flame-resistant products except fibreform products (flame-resistant formed products), such as sheet-like products and cubic molded products, are obtained, the use of flame-resistant formed products is markedly extended. In addition, the appropriateness of manufacturing conditions and carbonizing conditions thereof allows carbon fiber with optional degree of fineness and carbon products except fibreform products (carbon product), such as a carbon product group of sheet-like carbon and cubic carbon molded products, and extends uses thereof. The improvement of yield while maintaining high physical properties of carbon products brings advantages in costs.

Dissolution by solvent has been studied as a method for solving the above technical problem.

For example, a technique is disclosed such that acrylonitrile polymer powder is heated in inert atmosphere until the density becomes 1.20 g/cm$^3$ or more, and thereafter dissolved in solvent and fiberized into a fibriform product, which is heat-treated (for example, refer to Patent Document No. 1).

However, the problem is that viscosity change with time of solution is so great as to frequently cause thread breakage by reason of using acrylonitrile polymer powder with flame resistance less performed. A device made of special materials having corrosion resistance needs to be used by reason of using as solvent strongly acidic solvents such as sulfuric acid and nitric acid for easily decomposing general organic polymers, leading to impractical costs.

A method is proposed such that heat-treated acrylonitrile polymer powder and not heat-treated acrylonitrile polymer powder are mixed and similarly dissolved in acidic solvent (for example, refer to Patent Document No. 2); however, the problem is still not solved on allowing corrosion resistance to a device as described above and instability of solution.

In addition, the conversion of polyacrylonitrile to a polymer having cyclization chemical structure by heat-treating dimethylformamide solution of polyacrylonitrile is disclosed (for example, refer to Non-Patent Document No.1); however, the polymer solution is dilute concentration of 0.5% and so low in viscosity as to be substantially difficult in forming into fiber, and a rise in concentration thereof causes the polymer to be deposited and incapable of being used as solution.

On the other hand, a solution in which polyacrylonitrile is denatured with a primary amine is disclosed (for example, refer to Non-Patent Document No.2); however, the solution is such as to impart hydrophilic property to polyacrylonitrile itself with flame resistance less performed, and totally differs in technical ideas from a flame-resistant polymer-containing solution.

A technique is disclosed such that the yield can be improved together with high physical properties in a conversion example from flame-resistant fiber to carbon fiber on the special carbonizing conditions (for example, refer to Patent Document No.3); however, compatibility therebetween in an easier method has been demanded.

[Patent Document No. 1] Japanese Patent Publication No.63-14093B

[Patent Document No. 2] Japanese Patent Publication No.62-57723B

[Patent Document No. 3] Japanese Patent Publication No. 26365093B

[Non-Patent Document No.1] "Polymer Science (USSR)", 1968, Vol. 10, page 1537

[Non-Patent Document No.2] "Journal of Polymer Science, Part A: Polymer Chemistry", 1990, Vol. 28, page 1623

DISCLOSURE OF THE INVENTION

[Problems to be Solved by the Inventions]

In view of the above-mentioned problems, the object of the present invention is to provide a flame-resistant polymer so excellent in forming processability as to produce a flame-resistant formed product also in unprecedented shapes, a flame-resistant polymer-containing solution and a manufacturing method for conveniently producing these, and to further provide a flame-resistant formed product, a carbon molded product employing the flame-resistant polymer and a manufacturing method for conveniently producing them.

[Means for Solving the Problems by the Inventions]

In order to achieve the above-mentioned object, the present invention has the following construction:

(1) a flame-resistant polymer being denatured with an amine compound,
(2) the above-mentioned flame-resistant polymer in which a precursor of the flame-resistant polymer is an acrylonitrile polymer,
(3) a flame-resistant polymer-containing solution containing a flame-resistant polymer and a polar organic solvent,
(4) the above-mentioned flame-resistant polymer-containing solution in which the polar organic solvent is an amine organic solvent,
(5) the flame-resistant polymer-containing solution according to claim 3, in which the amine organic solvent is an amine compound having two or more functional groups,
(6) the flame-resistant polymer-containing solution according to any one of the above, in which the flame-resistant polymer is denatured with the amine compound,
(7) the flame-resistant polymer-containing solution according to any one of the above, in which the above-mentioned flame-resistant polymer is obtained by using an acrylonitrile polymer as a precursor,
(8) the flame-resistant polymer-containing solution according to any one of the above, in which a concentration of the flame-resistant polymer calculated by the following expression is 2 to 70% by weight; flame-resistant polymer concentration (% by weight)=100×flame-resistant polymer weight (g)/flame-resistant polymer-containing solution weight (g) where flame-resistant polymer weight indicates a weight of solid component remaining in heating the flame-resistant polymer-containing solution in nitrogen at a rate of 50° C. minute up to 300° C.,
(9) a method for manufacturing a flame-resistant polymer-containing solution containing a flame-resistant polymer and a polar organic solvent, characterized by making a precursor of the flame-resistant polymer flame-resistant in an amine organic solvent or the polar organic solvent containing an amine compound,
(10) a method for manufacturing a flame-resistant polymer-containing solution containing a flame-resistant polymer and a polar organic solvent, characterized by dissolving the flame-resistant polymer in an amine organic solvent or the polar organic solvent containing an amine compound,
(11) a flame-resistant formed product comprising a part or the whole thereof composed of a flame-resistant polymer denatured with an amine compound,
(12) the above-mentioned flame-resistant formed product being fibrous,
(13) the flame-resistant formed product according to (11), being sheet1 and having a thickness of 5 mm or less,
(14) a carbon molded product comprising a part or the whole thereof composed of a carbon component obtained by carbonizing a flame-resistant polymer denatured with an amine compound,
(15) the above-mentioned carbon molded product being fibrous,
(16) the carbon molded product according to (14), being sheet and having a thickness of 5 mm or less,
(17) the carbon molded product according to any one of claims 14 to 16, in which a crystal size Lc (Å) measured by wide-angle X-rays is 30 or less, and Lc and a nitrogen content N (% by weight) satisfy [$N \geqq 0.04(Lc-30)^2+0.5$],
(18) a method for manufacturing a flame-resistant formed product comprising the steps of:
forming the flame-resistant polymer-containing solution according to any one of (3) to (8); and removing a solvent after the above-mentioned step,
(19) the above-mentioned method for manufacturing a flame-resistant formed product, in which the above-mentioned step of forming is the step of forming into being sheet,
(20) the method for manufacturing a flame-resistant formed product according to (18), in which the above-mentioned step of forming is the step of forming into being fibrous,
(21) a method for manufacturing a carbon moldedproduct, characterized by carbonizing the flame-resistant formed product according to any one of (11) to (13), and
(22) a method for manufacturing a carbon molded product, characterized by carbonizing a flame-resistant formed product obtained by the method according to any one of (18) to (20).

[Effect of the Inventions]

The present invention can provide a solution containing a flame-resistant polymer which can be formed into various shapes as described below. The use of such a flame-resistant polymer allows a flame-resistant formed product also in unprecedented shapes. Such a flame-resistant molded product can directly be carbonized and carbon products in various shapes can efficiently be manufactured.

REFERENCE NUMERALS

Figure 1:
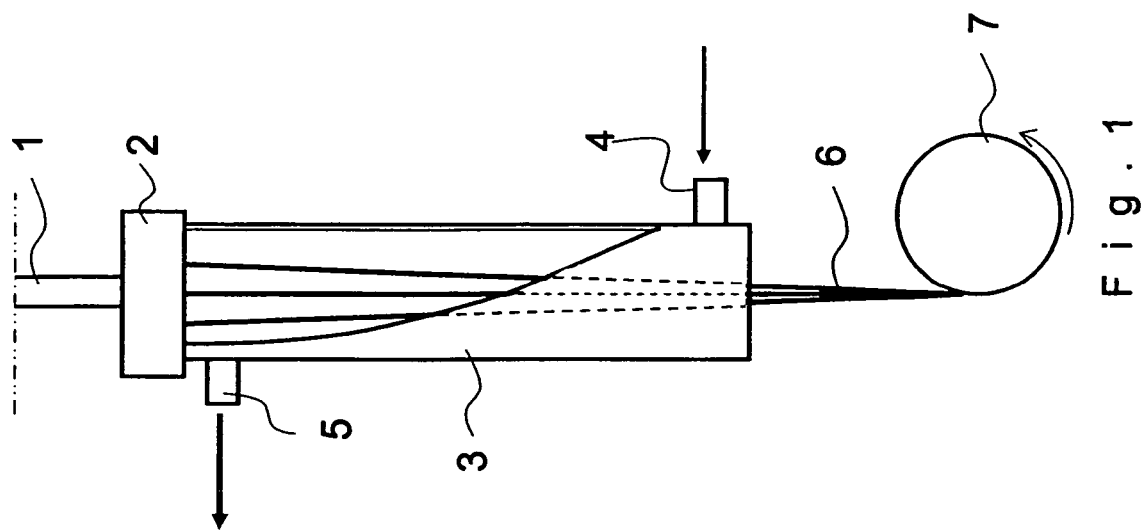
FIG. 1 is a conceptual view of a dry spinning method used in Example 2.

Reference numerals are as follows.
1 flame-resistant polymer flow path
2 spinning head
3 spinning cylinder
4 heated nitrogen inlet
5 heated nitrogen outlet
6 fibrous flame-resistant formed product
7 wind-up roller

BEST MODE FOR CARRYING OUT THE INVENTION

A flame-resistant polymer of the present invention is a polymer having flame resistance and a flame-resistant polymer-containing solution is a solution in which a component mainly including a flame-resistant polymer is dissolved in an organic solvent. Here, the solution is preferred to be viscous fluid and a solution having flowability in forming and molding, and includes solutions having flowability at room temperature as well as all solutions having flowability around processing temperature by heating and shear force even though solid and gel having no flowability at some temperature.

Flame resistance in the present invention signifies substantially the same as the term 'fire resistance' and is employed while including the meaning of the term 'flame retardance'. Specifically, flame resistance is a general term denoting properties of difficulty to continue combustion, namely, difficulty to burn. A fire resistance test method of thin materials (45° Meckel burner method) is described as a specific means of evaluating flame-resistant performance, for example, in JIS Z 2150 (1966). A test sample to be evaluated (board, plate, sheet, film, thick fabric and the like having a thickness of less than 5 mm) can be determined by heating with a burner for a specific time to evaluate flaming time, carbonized length etc. after igniting. Shorter flaming time and shorter carbonized length are determined as more excellent flame-resistant (fire-resistant) performance. In the case of fiber products, a combustion test method of fiber is described in JIS L 1091 (1977). Fiber products can similarly be determined by measuring carbonized area and flaming time after testing by the method. Shapes and forms of flame-resistant polymers and flame-resistant formed products of the present invention are of so various kinds as to cover a wide range in the degree of flame-resistant performance from very high flame resistance exhibiting no ignition at all to a certain continuation of combustion after ignition, and flame-resistant polymers and flame-resistant formed products which offer flame-resistant performance on a predetermined level or higher by a specific evaluation method described in the after-mentioned examples are regarded as the objects. Specifically, flame-resistant performance is preferably 'excellent' or 'favorable'. In particular, at the stage of flame-resistant polymers, the conditions of isolation cause shapes and forms of the polymers to change and flame resistance to easily vary greatly, so that it is preferable to adopt a method of evaluating after forming into predetermined shapes.

Flame-resistant formed products such as flame-resistant fiber forming out of flame-resistant polymers can also be measured by a specific means of evaluating flame resistance described in the after-mentioned examples.

Flame-resistant polymers in the present invention are typically the same or similar to chemical structure of the so-called flame-resistant fiber and stabilized fiber, and examples thereof include polyacrylonitrile polymer heated in the air as precursor, oxidized pitch raw material on the basis of petroleum and coal, and phenolic resin precursor. Flame-resistant polymers obtained by using polyacrylonitrile as a precursor are preferable in view of easy dissolution.

In the case of using polyacrylonitrile polymer as a precursor, the structure of flame-resistant polymer is not completely definite and conceived to have a structure of naphthyridine ring, acridone ring or hydrogenated naphthyridine ring caused by cyclization reaction or oxidation reaction of nitrile groups in a literature of analysis of acrylonitrile-based flame-resistant fiber (Journal of Polymer Science, Part A: Polymer Chemistry Edition, 1986, Vol.24, page 3101), which flame-resistant polymer is generally called ladder polymer in view of structure. Needless to say, it is no problem unless flame resistance is deteriorated even though unreacted nitrile groups remain, and no problem unless solubility is deteriorated even though cross linkage is caused by a very small quantity between molecules.

In the case of measuring 13-C of the flame-resistant polymer itself or solution thereof by a nuclear magnetic resonance (NMR) apparatus, a structure having signals in 150 to 200 ppm resulting from the polymer is preferable. The absorption in the range renders flame resistance favorable.

The molecular weight of flame-resistant polymer is not particularly limited but preferred to be a molecular weight having viscosity according to forming methods.

A flame-resistant polymer denatured with an amine compound is preferably used as a flame-resistant polymer of the present invention. Examples of the state 'denatured with an amine compound' herein include a state such that an amine compound is chemically reacted with a raw material precursor polymer, or a state such that an amine compound is taken into the polymer by interaction such as hydrogen bond or van der Waals force. It is found by the following method whether a flame-resistant polymer in a flame-resistant polymer-containing solution is denatured with an amine compound.

A. Spectroscopic method, such as a means of analyzing the difference in structure from undenatured polymer by using the above-mentioned NMR spectrum, infrared absorption (IR) spectrum and the like.

B. Means of confirming by measuring flame-resistant polymer weight in a flame-resistant polymer-containing solution by the after-mentioned method to confirm whether the weight increases with respect to a precursor polymer as raw materials In the case of the former means, a part deriving from an amine compound used as a denaturant is added as a new spectrum to the spectrum of a flame-resistant polymer denatured with an amine compound with respect to the spectrum of a polymer typically obtained by air oxidation (not denatured with an amine compound).

In the case of the latter means, typically, the same weight as the weight of precursor fiber is generally obtained in flame-resistant fiber by air oxidation, and the weight is increased by denaturing with amine by 1.1 times or more, 1.2 times or more and 1.3 times or more in increasing order of preference with respect to the precursor polymer. The amount of increase is 3 times or less, 2.6 times or less and 2.2 times or less at the upper limit in increasing order of preference. A small change in weight brings a tendency to render the dissolution of a flame-resistant polymer insufficient, and brings a possibility that the polymer component becomes foreign matter in making into flame-resistant formed products and carbon molded products. On the other hand, a great change in weight occasionally deteriorates flame resistance of the polymer.

Here, a flame-resistant polymer can be water-insoluble or water-soluble. Water-insolubility or water-solubility is related to selection of solvents and rate of the above-mentioned change in weight, and higher weight increase rate in using an amine compound as a solvent is recognized to bring a tendency to be water-soluble; however, the details are not apparent.

Water-insoluble or water-soluble polymer can properly be selected by objects and uses, and more heat treatment leads to water-insoluble polymer more frequently at the stage of formed products later.

An amine compound capable of being used for amine denaturation for obtaining a flame-resistant polymer may be any of compounds having primary to quaternary amino groups; specific examples thereof include ethanolamines such as monoethanolamine, diethanolamine, triethanolamine and N-aminoethyl ethanolamine, polyethylene polyamines such as ethylenediamine, diethylenetriamine, triethylenetetramine, tetraethylenepentamine, pentaethylenehexamine and N-aminoethyl piperazine, and ortho-, meta- and para-phenylenediamines.

In particular, the compounds preferably have functional groups having element such as oxygen, nitrogen and sulfur, for example, hydroxyl groups besides amino groups, and compounds having two or more functional groups including amino groups and functional groups except such amines are preferable from the viewpoint of reactivity. These can be used in one kind, or two kinds or more together. In the case of compounds having functional groups except amino groups, such as hydroxyl groups, hydroxyl groups can denature a flame-resistant polymer.

A flame-resistant polymer of the present invention can be made into a solution using an organic solvent as solvent. The content of a flame-resistant polymer is 2% by weight or more, 10% by weight or more and 20% by weight or more at the lower limit in increasing order of preference, and 70% by weight or less, 60% by weight or less and 50% by weight or less at the upper limit in increasing order of preference. In the case of low concentration, the effect of the present invention itself is not deteriorated and productivity in molding is occasionally low, though; in the case of high concentration, flowability is so poor as to occasionally perform molding process with difficulty. Here, flame-resistant polymer concentration is calculated by the following expression. [flame-resistant polymer concentration (% by weight)]=100×[flame-resistant polymer weight]/[flame-resistant polymer-containing solution weight] Flame-resistant polymer weight is calculated by using a thermogravimetric analysis instrument (TG) as weight of solid component remaining in heating flame-resistant polymer-containing solution in nitrogen gas at a rate of 50° C./minute up to 300° C. In the case where the use of proper coagulant (precipitant) allows solid polymer to be separated, flame-resistant polymer weight can directly be calculated from weight of coagulative polymer. Specifically, in the case of water-insoluble polymer, flame-resistant polymer-containing solution is projected into water to sufficiently wash water-soluble component out of the polymer with warm water of 90° C. and calculate flame-resistant polymer weight as weight of solid polymer after drying.

An amine organic solvent can be used as organic solvent. Such a solvent may be any of compounds having primary to quaternary amine structure. The use of such an amine organic solvent allows a flame-resistant polymer-containing solution, in which a flame-resistant polymer is uniformly dissolved, and a flame-resistant polymer having favorable moldability together.

A flame-resistant polymer of the present invention can also be made into a solution using a polar organic solvent as solvent. This solvent can contain an amine compound such as an amine organic solvent. The reason therefor is that a flame-resistant polymer denatured with an amine compound has so high polarity that a polar organic solvent dissolves the polymer well.

Here, a polar organic solvent has hydroxyl groups, amino groups, amide groups, sulfonyl groups, sulfone groups and the like, and additionally favorable compatibility with water; specific examples thereof include ethylene glycol, diethylene glycol, triethylene glycol, polyethylene glycol having a molecular weight of approximately 200 to 1000, dimethyl sulfoxide, dimethylformamide, dimethylacetamide, N-methylpyrrolidone, the above described as amine organic solvents, namely, ethanolamines such as monoethanolamine, diethanolamine, triethanolamine and N-aminoethyl ethanolamine, polyethylene polyamines such as ethylenediamine, diethylenetriamine, triethylenetetramine, tetraethylenepentamine, pentaethylenehexamine and N-aminoethyl piperazine, and ortho-, meta- and-para-phenylenediamines, which can be used also as an amine denaturant. These may be used in only one kind, or a mixture of two kinds or more.

Above all, dimethyl sulfoxide is preferable in view of being applicable to wet spinning for the reason that a flame-resistant polymer is so easily coagulated in water as to easily become a minute and hard polymer.

In the case of an amine solvent, the solvent preferably has functional groups having element such as oxygen, nitrogen and sulfur, for example, hydroxyl groups besides amino groups, and compounds having two or more functional groups including amino groups and functional groups except such amines are preferable from the viewpoint of solubility. A flame-resistant polymer-containing solution, in which a flame-resistant polymer is more uniformly dissolved, allows flame-resistant formed products with less foreign matter, and allows the after-mentioned moldability into being fibrous and sheet to be improved.

Within a range of not impairing the object, for example, a water-soluble flame-resistant polymer may be made into a uniform solution by using other solvents such as water (for example, water-soluble solvents) in combination with a polar organic solvent. The use of water is preferable from the viewpoint of the after-mentioned comparative easiness of removing solvents during molding as well as costs. The added amount of water is 5 parts by weight or more, 10 parts by weight or more and 20 parts by weight or more at the lower limit, and 300 parts by weight or less, 200 parts by weight or less and 150 parts by weight or less at the upper limit in increasing order of preference with respect to 100 parts by weight of a flame-resistant polymer.

In the case of an amine solvent, polar organic solvents such as ethylene glycol, diethylene glycol, triethylene glycol, polyethylene glycol having a molecular weight of approximately 200 to 1000, dimethyl sulfoxide, dimethylformamide, dimethylacetamide and N-methylpyrrolidone may be contained as a small amount of other components to be mixed. The use of such compounds together with an amine organic solvent is preferable by reason of not merely allowing a flame-resistant polymer-containing solution at low costs but also facilitating the after-mentioned removal of solvents in the step of molding.

The viscosity of a flame-resistant polymer-containing solution of the present invention can be determined at a preferable range by each of forming methods and molding methods using polymer, molding temperature, and kinds of mouthpieces and metal molds. The viscosity can generally be used at a range of 1 to 100000 Pa·s in measurement at a temperature of 50° C.; preferably 10 to 10000 Pa·s, more preferably 20 to 1000 Pa·s. Such viscosity can be measured by various kinds of viscometers such as rotary viscometer, rheometer and B-type viscometer. The viscosity is preferred to be determined in the above-mentioned range by any one of measuring methods. Even though the viscosity is out of such a range, the viscosity can also be used as proper viscosity by heating or cooling during forming.

Next, examples of a method of manufacturing a flame-resistant polymer-containing solution of the present invention are described. Examples of a method of obtaining a flame-resistant polymer-containing solution of the present invention include the following methods:

A. Method of making a precursor polymer flame-resistant in a solution; and

B. Method of directly dissolving a flame-resistant polymer component in a solvent.

In any of the above-mentioned methods, examples of a precursor polymer as raw materials include polyacrylonitrile polymer, polymer using pitch made of petroleum and coal as raw materials, and phenolic resin. Above all, polyacrylonitrile polymer is preferable in view of solubility.

Polyacrylonitrile polymer preferably comprises acrylic polymer having structure derived from acrylonitrile in view of easy progression of a reaction for making flame-resistant and solubility. In the case of such acrylic copolymer, structure unit derived from acrylonitrile preferably comprises copolymer preferably comprising 85 mol % or more, more preferably 90 mol % or more and further more preferably 92 mol % or more of acrylonitrile and other copolymer components. A method of polymerizing such acrylonitrile polymer is not particularly limited; solution polymerization method, suspension polymerization method, slurry polymerization method and emulsion polymerization method are applicable.

Specific examples of copolymer components include allyl sulfonic acid metallic salt, methacryl sulfonic acid metallic salt, acrylate ester, methacrylate ester and acrylamide. Compounds containing vinyl groups, specifically acrylic acid, methacrylic acid and itaconic acid, can be copolymerized as components for promoting to make flame-resistant besides the above-mentioned copolymer components, and partial or the whole amount of the compounds may be neutralized with alkaline components such as ammonia. The number-average molecular weight of acrylonitrile polymer can optionally be selected from approximately 1000 to 1000000. The number-average molecular weight can be calculated from measurement of intrinsic viscosity of dilute solution.

In the case of dissolving a precursor polymer in a polar organic solvent, shapes and forms of the precursor polymer may be any of powder, flake and fiber, and polymer waste and yarn waste caused during polymerization and spinning can also be used as recycling raw materials. The state of powder, particularly, particulates of 100 µm or less is preferable in view of solubility in solvent. The precursor polymer is previously dissolved in solvent at the stage of a monomer and polymerized by a proper polymerization method to obtain a polymer solution, which can also directly be used.

In the case of directly dissolving a flame-resistant polymer in a polar organic solvent, a polymer can be used such that the above-mentioned precursor polymer is oxidized under oxygen atmosphere at a proper temperature, for example, 200 to 300° C. With regard to such a polymer with flame resistance promoted, shapes thereof are not particularly limited but may be fibrous, particulate, powdery or porous. A flame-resistant polymer may be used such that a precursor polymer previously made into the above-mentioned shapes is made flame-resistant, and a precursor polymer like filament yarn may be made flame-resistant, and thereafter cut and processed into proper shapes. Commercial flame-resistant products may be used, and wastes caused in the steps of manufacturing such flame-resistant products may be used. Such methods allow once caused flame-resistant fiber wastes to be recycled and manufactured for flame-resistant products.

Even in the case of dissolving a precursor polymer in an amine solvent or a polar organic solvent in the presence of an amine compound, and even in the case of dissolving a flame-resistant polymer in an amine solvent or a polar organic solvent in the presence of an amine compound, the dissolution may be performed under normal pressures, or under pressurization or decompression depending on the situations. Mixers such as extruders and kneaders except ordinary reaction vessels with a stirrer can be used singly or in combination as apparatuses used for dissolving.

In this case, the dissolution is preferably performed by using 100 to 1900 parts by weight, more preferably 150 to 1500 parts by weight of an amine solvent or the total of an amine compound and a polar organic solvent with respect to 100 parts by weight of an acrylonitrile polymer.

In the case where a precursor polymer is dissolved in an amine solvent or a polar organic solvent in the presence of an amine compound and thereafter made flame-resistant, oxidizing agents are preferably used for sufficiently promoting to make flame-resistant. Oxidizing agents can be used for further improving the degree of making flame-resistant a polymer with flame resistance promoted. Examples of such oxidizing agents to be used include organic or inorganic oxidizing agents. Above all, it is preferable to add air in view of handling and costs. Oxidizing agents to be easily mixed into solvent systems are preferably used for uniformly promoting to make flame-resistant or dissolved in a liquid phase. Specific examples thereof include nitro, nitroxide and chinone-based oxidizing agents. Above all, particularly preferable examples thereof include aromatic nitro compounds such as nitrobenzene, ortho-, meta- and para-nitrotoluene, and nitroxylene. The added amount of these oxidizing agents is not particularly limited, and preferably 0.01 to 100 parts by weight, more preferably 1 to 80 parts by weight and further more preferably 3 to 60 parts by weight with respect to 100 parts by weight of a precursor polymer. Such compounding ratio facilitates the control of concentration of a flame-resistant polymer-containing solution finally obtained in the above-mentioned preferable range.

In the case where a precursor polymer is dissolved in an amine solvent or a polar organic solvent in the presence of an amine compound and thereafter made flame-resistant, an amine solvent and oxidizing agents, or an amine compound and a polar organic solvent and oxidizing agents may be mixed before adding a precursor polymer or mixed simultaneously with a precursor polymer. It is preferable in view of less insoluble matter that a precursor polymer, an amine compound and a polar organic solvent are previously mixed and dissolved by heating, to which oxidizing agents are then added to obtain a flame-resistant polymer. Needless to say, components except a precursor polymer, oxidizing agents, an amine compound and a polar organic solvent are not prevented from being mixed into such a solution.

Such a mixed solution of a precursor polymer, an amine compound and a polar organic solvent is heated at proper temperatures to thereby promote to make the precursor polymer dissolved or flame-resistant. On this occasion, temperatures vary with solvents and oxidizing agents to be used, being preferably 100 to 350° C., more preferably 110 to 300° C. and further more preferably 120 to 250 ° C. Needless to say, even in the case of dissolving a precursor polymer with flame resistance previously performed, heating may further promote to make flame-resistant.

A flame-resistant polymer-containing solution of the present invention obtained by the above-mentioned method preferably includes no unreacted matter, insoluble matter and gel, which can remain in very small quantities. Depending on the cases, unreacted matter and insoluble matter are preferably filtered and dispersed by using a sintered filter or the like before molding into being fibrous.

A flame-resistant polymer-containing solution of the present invention may include inorganic particles such as silica, alumina and zeolite, pigment such as carbon black, antifoaming agent such as silicone, stabilizer and flame retardant such as phosphorus compounds, various kinds of surfactants, and other addition agents. Inorganic compounds such as lithium chloride and calcium chloride can be included for the purpose of improving solubility of the flame-resistant polymer. These may be added before promoting to make flame-resistant or after promoting to make flame-resistant.

In the case where ethylene glycol, diethylene glycol, triethylene glycol, polyethylene glycol, dimethyl sulfoxide, dimethylformamide, dimethylacetamide as the above-mentioned polar compounds are included, these compounds may be added to an amine organic solvent or included in a precursor polymer.

Viscosity, polymer concentration, the degree of making flame-resistant and kinds of solvents of a flame-resistant polymer-containing solution finally obtained can properly be adjusted to the above-mentioned preferable range.

Next, flame-resistant formed products employing a flame-resistant polymer are described. Flame-resistant formed products of the present invention are such that a part or the whole thereof is composed of a flame-resistant polymer denatured with an amine compound. Flame-resistant formed products may be composed of the above-mentioned flame-resistant polymer-containing solution of the present invention compounded into other polymers and compounds.

Such flame-resistant formed products of the present invention can be obtained through the step of forming the above-mentioned flame-resistant polymer-containing solution of the present invention and the step of removing a solvent.

Such flame-resistant products may be fibrous, sheet, other cubic or plane shapes. That is, the forming into being fibrous in the step of forming allows fibrous flame-resistant formed products, the forming into being sheet allows sheet flame-resistant formed products, and the forming into other cubic shapes allows cubic flame-resistant formed products.

Fibrous flame-resistant formed products of the present invention may be like filament yarn or staple fiber. In the case of being like filament yarn, the flame-resistant formed products are appropriate for the case of being paralleled and used directly as raw materials of carbon fiber, while in the case of being like staple fiber, the flame-resistant formed products are appropriate for the case of being made into fabric such as textile, knitted goods and nonwoven fabric by using crimped fiber as materials.

Fibrous flame-resistant formed products of the present invention may be single fiber or fiber strand made of plural single fibers. In the case of being made into fiber strand, the number of single fibers in a strand is properly determined by purpose of use, being preferably 50 to 100000 pieces/strand, more preferably 100 to 80000 pieces/strand and further more preferably 200 to 60000 pieces/strand in view of high-order processability.

The degree of fineness of each single fiber is preferably 0.00001 to 100 dtex, more preferably 0.01 to 100 dtex in the case of being used as raw materials of carbon fiber, and meanwhile preferably 0.1 to 100 dtex, more preferably 0.3 to 50 dtex in the case of being processed into fabric. The diameter of single fiber is preferably 1 nm to 100 µm, more preferably 10 nm to 50 µm in the case of being used as raw materials of carbon fiber, and meanwhile preferably 5 to 100 µm, more preferably 7 to 50 µm in the case of being processed into fabric.

The cross-sectional shape of each single fiber of fibrous flame-resistant formed products of the present invention may be circle, ellipse, cocoon type or indefinite shape depending on the cases.

The specific gravity of fibrous flame-resistant formed products of the present invention is preferably 1.1 to 1.6, more preferably 1.15 to 1.55 and further more preferably 1.2 to 1.5. A specific gravity of less than 1.1 occasionally brings so many holes as to decrease strength, while a specific gravity of more than 1.6 occasionally brings so high denseness as to decrease ductility. The specific gravity can be measured by immersion method and sink-float method.

The single fiber tensile strength of fibrous flame-resistant formed products of the present invention is preferably 0.1 to 10 g/dtex, more preferably 0.2 to 9 g/dtex and further more preferably 0.3 to 8 g/dtex. Such tensile strength can be measured by using a universal tensile tester (such as Model 1125, manufactured by Instron Corporation) in conformity to JIS L1015 (1981).

The residual amount of solvent components contained in fibrous flame-resistant formed products of the present invention is preferably 10% by weight or less, more preferably 5% by weight or less and further more preferably 1% by weight or less. Such a solvent residual rate of more than 10% by weight occasionally deteriorates flame resistance.

Next, a method of manufacturing flame-resistant formed products of the present invention is described. With regard to flame-resistant formed products of the present invention, the above-mentioned flame-resistant polymer-containing solution of the present invention can directly be processed into flame-resistant formed products in fibrous, sheetlike, other plane or cubic shapes. Depending on the cases, a flame-resistant polymer of the present invention can be compounded into other polymers and compounds, and formed and molded to obtain flame-resistant formed products. Specifically, a flame-resistant polymer-containing solution of the present invention can be compounded into an acrylonitrile polymer and thereafter spun to obtain fibrous flame-resistant formed products, or the flame-resistant polymer-containing solution can be compounded into epoxy resin and thereafter molded and cured to obtain flame-resistant formed products. In this case, a polar organic solvent, particularly preferably an amine organic solvent, can also directly be utilized as a curing agent of epoxy resin. The solvent can be used for extensive uses by reason of being dissolved.

Next, with regard to each of flame-resistant formed products in fibrous, sheet or other shapes, a specific method of manufacturing is described below.

A method of molding a flame-resistant polymer-containing solution into being fibrous, namely, obtaining flame-resistant fiber is not particularly limited, and spinning methods such as wet spinning method, semi-dry spinning method, dry spinning method and flash spinning method can be applied directly or through improvement. Electronic spinning method can also be used Dry spinning method is preferable in view of convenience of processes, and a method of discharging a flame-resistant polymer from a mouthpiece to vaporize solvent. Depending on the cases, it can be used together that coagulation is promoted in a water bath accommodating metallic salt to remove water-soluble components. Drying method such as to send ordinary hot air and steam, irradiate with infrared rays and high- frequency electromagnetic waves, and reduce pressure can properly be selected. Ordinary hot air can be sent by parallel flow or cross flow in the traveling direction of fiber. Far infrared rays, mid-infrared rays and near infrared rays can be used for infrared rays of radiation heating type, and irradiation of microwaves can also be selected. Drying temperature can optionally be determined in a range of approximately 50 to 450° C.

Wet spinning method and semi-dry spinning method are preferable for improving productivity of processes, and water can be used as one component of a coagulation bath by selecting a water-insoluble flame-resistant polymer. Specifically, coagulation is performed in a water bath or a mixing bath of solvent/water at approximately 10 to 60° C., and coagulated yarn is washed and drawn or contracted to remove solvents in the yarn and thereafter dry in a range of approximately 50 to 450° C. The same method as dry spinning method can be selected as drying method. In addition, heat treatment can also be performed in a range of approximately 200 to 400° C. Coagulation bath concentration can be determined in an optional range of solvent/water=0/100 to 95/5. Coagulation bath temperature can be determined at an optional temperature of 0 to 100° C. With regard to a coagulation bath, alcohols having reduced affinity with water such as propanol and butanol can be used for 100%-bath.

Either of filament yarn and staple fiber can be obtained as flame-resistant fiber and is properly selected including spinning methods. Either method of cold draw and hot draw can be used for further draw. Hot air and steam are properly selected for heating. Draw ratio is preferably 1.1 to 4 times, more preferably 1.2 to 3 times and particularly preferably 1.3 to 2 times. Draw ratio is determined by strength and degree of fineness of flame-resistant fiber to be required.

Lubricants are properly added in accordance with necessity of high-order processing. Kinds of lubricants are not particularly limited, and polyether and polyester surfactants, silicone, amino-denatured silicone, epoxy-denatured silicone and polyether-denatured silicone are added singly or in a mixture, and other lubricants may be added.

Fibrous formed products may be strand made of plural single fibers, and the number of single fibers included in a strand is properly selected for purpose of use. The above-mentioned preferable number thereof can be obtained by adjustment of mouthpiece hole number or doubling of fibrous flame-resistant formed products of plural pieces.

The degree of fineness of single fiber can be controlled to the above-mentioned preferable range by selecting diameter of mouthpiece hole and properly determining discharge amount from mouthpiece.

In the case of increasing the degree of fineness of single fiber, it is preferable in view of decreasing solvent residual amount to prolong drying time or raise drying temperature. In the case of obtaining fibrous flame-resistant formed products having lower degree of fineness of single fiber, electronic spinning method is preferably used. Such a method also allows the degree of fineness on nanofiber level; preferably a diameter of 100 nm or less, more preferably 1 to 100 nm and further more preferably 5 to 50 nm.

The cross-sectional shape of fibrous flame-resistant formed products (flame-resistant fiber) can be controlled by shapes of circular hole, elliptic hole and mouthpiece discharge hole such as slit, and conditions of removing solvent.

The specific gravity of flame-resistant fiber of the present invention can be controlled, for example, by drying or heat-treating conditions. The specific gravity in the above-mentioned preferable range can be obtained by setting a drying temperature of 50 to 450° C. as drying conditions and a range of 200 to 400° C. as heat-treating conditions. Drying in the air promotes oxidation and occasionally leads to a preferable phenomenon such as an increase in carbonization yield.

Higher drying temperature than the boiling point of solvent as drying conditions allows residual amount of solvent and volatile component in flame-resistant fiber to be set at 10% or less as described above.

Next, sheetlike flame-resistant formed products of the present invention are described. 'Sheetlike' herein is a concept also including thin films. The thickness is not particularly limited; preferably 5 mm or less, more preferably 2 mm or less and further more preferably 1 mm or less. A thickness of more than 5 mm brings a tendency to embrittle. A preferable thickness can properly be selected in accordance with uses, and a thickness as thin as approximately 0.5 mm is frequently enough to use as general industrial products.

A preferable range of specific gravity of sheetlike flame-resistant formed products is 1.1 to 1.6. A specific gravity of less than 1.1 occasionally causes cracks, while a specific gravity of more than 1.6 occasionally brings low ductility.

A preferable range of volatile component content of sheetlike flame-resistant formed products is 10% by weight or less. A volatile component content of more than 10% by weight occasionally deteriorates flame resistance. Less volatile component content is more preferable, more preferably 5% by weight or less, further more preferably 3% by weight or less and ideally 0; a content of approximately 1% by weight occasionally causes no practical problems.

Next, examples of manufacturing methods of sheetlike flame-resistant formed products of the present invention are described. Examples thereof include a method of making the above-mentioned flame-resistant polymer-containing solution of the present invention into being sheetlike by cast film forming method. The solution is uniformly cast and thereafter dried in a constant-temperature dryer, and also gelatined in a bath such as water bath depending on the cases. The form can directly be fixed in a coagulation bath.

Flame-resistant formed products of the present invention can be made into being the above-mentioned fibrous, sheetlike, plane or cubic shapes of various kinds; for example, particulate typified by globes, tabular typified by thin sheets, columnar typified by sticks and indefinite shapes.

Examples of manufacturing methods of such products are described. Molding methods used in thermoplastic resin and thermosetting resin can be used; for example, injection molding, extrusion molding and compression molding. Cast molding method can also be applied thereto. Cast molding is preferable in view of allowing diverse shapes. Specifically, the above-mentioned flame-resistant polymer-containing solution of the present invention is put into a die in favorite shapes and dried to some degree in a constant-temperature dryer, for example. In addition, the solution is fixed in final shapes by using an embossing die immediately before not fluidizing. In this case, a flame-resistant polymer-containing solution to be used is not particularly limited if it is described above, and a flame-resistant polymer concentration of 5 to 50% by weight is preferably used in view of flowability. A viscosity of 10 to 150 Pa·s at a temperature of 50° C. is preferable in view of flowability.

Carbon molded products can be obtained by further carbonizing the above-mentioned flame-resistant molded products of various kinds. Carbon molded products of the present invention include fibrous carbon molded products (carbon fiber), sheetlike carbon products (carbon sheet) and carbon molded products in other shapes. 'Carbon molded products' herein has a carbon content of 80% by weight or more, more preferably 90% by weight or more.

In addition, with regard to carbon molded products, it is preferable that a crystal size Lc (Å) measured by wide-angle X-rays is 30 or less, and a nitrogen content N (% by weight) satisfy $N \geqq 0.04(Lc-30)^2+0.5$. The range is preferable in view of costs for the reason that high nitrogen amount improves the yield of carbon molded products while high crystallinity maintains high physical properties. Here, the nitrogen content can be measured by using an elemental analyzer. Generally, the increase of a crystal size of carbon molded products decreases the nitrogen content due to pyrolysis; however, carbon molded products in this range can easily be formed by carbonizing flame-resistant formed products of the present invention, which use a flame-resistant polymer denatured with amine as materials.

With regard to fibrous carbon products of the present invention, strength is 100 MPa or more, 200 MPa or more and 300 MPa or more at the lower limit, and 10000 MPa or less, 8000 MPa or less and 6000 MPa or less at the upper limit in increasing order of preference. Too low strength brings the case of not being used as reinforced fiber. Higher strength is more preferable, and 1000 MPa is occasionally sufficient for the object of the present invention.

With regard to fibrous carbon products of the present invention, fiber diameter is preferably 1 to $7 \times 10^4$ nm, more preferably 10 to $5 \times 10^4$ nm and further more preferably 50 to $10^4$ nm. A fiber diameter of less than 1 nm brings the case where fiber is easily broken, while a fiber diameter of more than $7 \times 10^4$ nm brings a tendency to easily cause defects. With regard to fibrous carbon products of the present invention, specific gravity is preferably 1.3 to 2.4, more preferably 1.6 to 2.1 and particularly preferably 1.6 to 1.75. A specific gravity of less than 1.3 brings the case where fiber is easily broken, while a specific gravity of more than 2.4 brings a tendency to easily cause defects. Specific gravity can be measured by liquid immersion method and sink-float method. Here, fibrous carbon products maybe hollow carbon fiber including a hollow part. In this case, a hollow part may be continuous or discontinuous.

A specific method of obtaining fibrous carbon products is such as to treat the above-mentioned fibrous flame-resistant formed products of the present invention (flame-resistant fiber) in inert atmosphere at the maximum temperature in a range of 300° C. or more and less than 2000° C. The maximum temperature is 800° C. or more, 1000° C. or more and 1200° C. or more at the lower limit in increasing order of preference, and usably 1800° C. or less at the upper limit.

Such carbon fiber can also be made into graphite fiber by further heating in inert atmosphere at a temperature of 2000 to 3000° C.

The obtained carbon fiber and graphite fiber can be electrolytically treated for surface modification thereof. Examples of electrolytic solution used for electrolytic treatment include acid solutions such as sulfuric acid, nitric acid and hydrochloric acid, and aqueous solutions of alkalis such as sodium hydroxide, potassium hydroxide and tetraethylammonium hydroxide, or salts thereof. Here, electrical quantity required for electrolytic treatment can properly be selected by carbon fiber and graphite fiber to be applied.

Such electrolytic treatment can adjust adhesive properties between carbon fiber materials, graphite fiber materials and matrix in obtained composite materials to solve brittle breaking of composite materials due to too high adhesion, the problem of decreasing tensile strength in fiber direction and the problem such that strength properties in orthogonal direction of fiber are not developed due to poor adhesive properties to resin though tensile strength in fiber direction is high, so that well-balanced strength properties in both of fiber direction and orthogonal direction of fiber are developed in obtained composite materials.

Thereafter, sizing treatment can also be performed for allowing the converging to obtained carbon fiber materials. With regard to sizing agents, sizing agents having favorable compatibility with resin can properly be selected in accordance with kinds of resin to be used.

With regard to sheetlike carbon products of the present invention, carbon content is preferably 80% by weight or more, more preferably 90% by weight or more. The thickness thereof is preferably 5 mm or less, more preferably 2 mm or less and further more preferably 1 mm or less. The sheet thickness can properly be selected in accordance with uses and may be a thickness of approximately 0.01 to 2 mm, such as the so-called film.

Sheetlike carbon products can be obtained by carbonizing the above-mentioned sheetlike flame-resistant formed products of the present invention. Specifically, the products can be obtained by treating in inert atmosphere at a temperature of 300° C. or more and less than 2000° C. The maximum temperature is 800° C. or more, 1000° C. or more and 1200° C. or more at the lower limit in increasing order of preference, and usably 1800° C. or less at the upper limit.

Such sheetlike carbon products can also be made into sheetlike graphite products by further heating in inert atmosphere at a temperature of 2000 to 3000° C.

A flame-resistant polymer-containing solution of the present invention can also be applied to coating of substrates. The coating of surfaces of glass substrates and metal substrates allows flame resistance, and the carbonization in the same manner as the above-mentioned flame-resistant fiber also allows carbon properties.

As described above, a manufacturing method of converting a flame-resistant polymer of the present invention into carbon molded products through flame-resistant formed products is described, and the step of obtaining flame-resistant formed products and the step of obtaining carbon products can each independently be performed or the steps can be performed as one step directly connected with continuity.

Specifically, in the case of obtaining carbon fiber from a flame-resistant polymer through flame-resistant fiber, a flame-resistant polymer-containing solution is spun into flame-resistant fiber to thereafter perform continuously up to carbonization without performing the step of winding-up, and further perform one continuous process including the steps of surface treating and allowing sizing agents.

It is preferable to continuously manufacture in one process from a flame-resistant polymer to carbon products from the viewpoint of low costs.

EXAMPLES

Next, the present invention is described more specifically by referring to examples. In examples, each of physical property values and properties was measured by the following methods.

<Concentration of a Flame-resistant Polymer-containing Solution>

Approximately 15 mg of a flame-resistant polymer-containing solution was precisely weighed and heated at a rate of 20° C. minute from 25° C. up to 300° C. by using a thermogravimetric instrument (abbreviated to a TG instrument), at which point of time the residual solid content was measured as a flame-resistant polymer amount, and the flame-resistant polymer amount was divided by a flame-resistant polymer-containing solution amount to calculate a flame-resistant polymer concentration (% by weight) in percentages. TG-DTA2000SA manufactured by Seiko Instruments Inc. was used as the thermogravimetric instrument.

In the case of a flame-resistant polymer to be completely coagulated in water, 5 g of a flame-resistant polymer-containing solution was repeatedly treated with 1 L of water heated to 90° C. for 30 minutes three times to gather solid components only, which were dried at a temperature of 120° C. for 1 hour to separate a flame-resistant polymer. The weight thereof was measured, and the flame-resistant polymer amount was divided by a flame-resistant polymer-containing solution amount to calculate a flame-resistant polymer concentration (%) in percentages.

<Viscosity of a Flame-resistant Polymer-containing Solution>

The viscosity was measured on the conditions of a frequency of 0.1 Hz and an amplitude of 1° by using a plate-plate type rheometer of Soliquidmeter (manufactured by Rheorogies Inc.). With regard to measured temperature, a value at a temperature of 50° C. was a central value through measurements at temperatures of 25° C. to 150° C.

<NMR Measurement of a Flame-resistant Polymer and a Flame-resistant Polymer-containing Solution>

A nuclear magnetic resonance spectrum of a flame-resistant polymer in solid was measured at an observed frequency of 75.2 MHz, an observed width of 30 kHz and a sample rotational speed of 10 kHz. CMX-300 manufactured by Chemimagnetic Corporation was used as the nuclear magnetic resonance apparatus.

A nuclear magnetic resonance spectrum of a flame-resistant polymer-containing solution was measured at a measuring nuclear frequency of 67.9 MHz, a spectrum width of 15015 kHz, a sample rotation number of 15 Hz by using the spectrum of solvent known at room temperature as internal standard. GX-270 manufactured by JEOL Ltd. was used as the nuclear magnetic resonance apparatus.

<Evaluation Method of Flame Resistance>

A. Indefinite Polymer

Flame resistance of each sample was evaluated on the selected conditions by a method in conformity to a fire resistance test method of thin materials (45° Meckel burner method) in JIS Z 2150 (1966). An indefinite polymer was ground into particles of approximately 20 μm, which were made into a disk having a diameter of 20 mm and a thickness of 1 mm by using a pressure molding machine (a pressure of 10 MPa) to obtain a sample. This disk was set in a test piece supporting frame inclined by 45° and placed in a combustion test box, and heated with fire of a Meckel burner having a height of 160 mm and an inside diameter of 20 mm for 10 seconds to evaluate flaming time and whether left as carbide after combustion. Shorter flaming time, namely, time when the sample continued to burn with flame from the end of heating was more excellent, and the whole area including the carbide was measured while retaining the shape of the sample; if 70% or more of the area before measuring remained, flame-resistant performance was evaluated as 'excellent'. If 40 to 70% or more thereof remained, flame-resistant performance was determined as 'favorable', and if less than 40% thereof remained, flame-resistant performance was determined as 'poor'.

B. Fiber

Fiber was made into a sample length of 30 cm with filaments of 1500 pieces by doubling to measure flaming time and carbonized length by flame of the same Meckel burner in the same manner as evaluation of a flame-resistant polymer, and evaluate flame resistance from the values. The following were determined: excellent flame resistance (flaming time of 10 seconds or less, carbonized length of 5 cm or less), favorable flame resistance (flaming time of 10 seconds or less, carbonized length of 10 cm or less), flame-resistant (flaming time of 10 seconds or less, carbonized length of 15 cm or less) or poor flame resistance (flaming time of more than 10 seconds, carbonized length of more than 15 cm). The number of measurement was n=5 and the most frequent state was regarded as flame resistance of the sample.

C. Sheet and Molded Products

Sheet and molded products were cut into a sample length of 30 cm and a width of 1 cm, and evaluated in the same manner as flame-resistant fiber.

<Fiber Tensile Strength of Flame-resistant Fiber and Carbon Fiber>

A tensile test was performed for either of the fibers in accordance with JIS L1015 (1981). Single fiber having a length of 25 mm was firmly fixed one by one to a slip of paper with smooth and glossy surface at intervals of 5 mm-width in a state such that both ends thereof were so loosely strained by an adhesive as to have a sample length of approximately 20 mm. The sample was attached to the grip of a single fiber tensile tester to cut the slip of paper near the grip at the top and measure at a sample length of 20 mm and a tension speed of 20 mm/minute. The number of measurement was n=50 and the average value was regarded as tensile strength.

<Break Strength of Flame-resistant Film and Carbon Film>

The tensile strength of films was measured at a temperature of 25° C. and 65% RH atmosphere by using a universal tensile tester in accordance with a method prescribed in JIS K7127 (1999). Instron 5582 type material testing machine was used as the universal tensile tester, and a sample was cut out to a size with a length of more than 100 mm and a strip of paper with a width of 10 mm. Initial tensile distance between chucks was 100 mm and tension speed was 200 mm/minute. The number of measurement was n=5 and the average value was regarded as break strength.

<Specific Gravity Measurement of Flame-resistant Molded Products and Carbon Molded Products>

Automatic specific gravity measuring equipment with an electronic balance attached by immersion method was made oneself, and specifically, ethanol was used for flame-resistant molded products and dichlorobenzene was used for carbon molded products, into which a sample was projected and measured. The sample was previously wetted sufficiently in another bath by using ethanol or dichlorobenzene before being projected to perform air vent process.

<Crystal Size Measurement of Carbon Molded Products>

Carbon fiber was cut into a length of 4 cm, fixed by using a metal mold and an alcoholic solution of corosion and made into a square pillar, which was regarded as a measurement sample. The measurement was performed with CuKα (Ni filter) as an X-ray source and an output of 40 kV and 20 mA by using a wide-angle X-ray diffractometer manufactured by Rigaku Denki Corporation.

Molded products except fiber were similarly cut into a proper size to thereafter make a sample and measure crystal size.

<Nitrogen Content of Carbon Molded Products>

A sample was subjected to oxidative decomposition and measured by using a CHN coder MT-3 type apparatus manufactured by Yanagimoto Ltd. on the conditions of a sample cracking furnace at 950° C., an oxidation furnace at 850° C. and a reducing furnace at 550° C.

Example 1

20 parts by weight of particulates of polyacrylonitrile-based copolymer obtained from 99.5 mol % of acrylonitrile and 0.5 mol% of itaconic acid by aqueous slurry polymerization method, and 74 parts by weight of monoethanolamine were weighed, projected into a flask, stirred and heated to a temperature of 160° C. The contents were discolored into orange through the gradual progress of cyclization reaction and other chemical reactions. The contents were dissolved in approximately 20 minutes and further stirred for 10 minutes.

Thereafter, 6 parts by weight of ortho-nitrotoluene was added to the solution, which was discolored from blackish brown into black by oxidation reaction, directly stirred at a temperature of 160° C. for 30 minutes, and cooled after finishing the reaction to obtain a flame-resistant polymer-containing solution. The flame-resistant polymer-containing solution was treated at a temperature of 300° C. to remove solvent and volatile component, and obtain a flame-resistant polymer. When flame resistance of this flame-resistant polymer was evaluated with a disk sample in accordance with the above-mentioned method, it was found that flaming time was as short as 8 seconds and 80% of the whole area remained in the shape of including the carbide, so that flame resistance was excellent.

The viscosity of the flame-resistant polymer-containing solution was 1000 Pa·s at a temperature of 25° C. and 150 Pa·s at a temperature of 50° C.

The flame-resistant polymer-containing solution was analyzed by 13C-NMR and then found to be a solution containing 4% by weight of o-toluisine besides monoethanolamine as solvent. A peak derived from chemical structure of the flame-resistant polymer, which was not recognized in polyacrylonitrile as a precursor polymer and solvents, existed definitely at 160 to 180 ppm.

The concentration of the flame-resistant polymer in the flame-resistant polymer-containing solution was 40% by weight measured by the above-mentioned method. That is, polyacrylonitrile polymer concentration of 20% by weight became flame-resistant polymer concentration of 40% by weight by denaturation with monoethanolamine as solvent, resulting in an increase to twice the amount of a precursor polymer.

Example 2

The flame-resistant polymer-containing solution of Example 1 was fibrillated by a dry spinning apparatus shown in FIG. 1. Specifically, the flame-resistant polymer-containing solution was discharged through a flame-resistant polymer flow path 1 from a mouthpiece having three holes with a diameter of 0.15 mm at a spinning head 2 to a spinning chimney 3 retained in an atmosphere of 300° C. by heated nitrogen to vaporize solvent. The spinning chimney 3 had a heated nitrogen inlet 4 and a heated nitrogen outlet, and the heated nitrogen flew in and out through these inlet and outlet. The obtained fibrous flame-resistant molded product 6 was once wound up on a wind-up roller 7 at a roller rate of 100 m/minute, which wind-up roller was detached to remove the remaining volatile component by further heat-treating in an oven at a temperature of 300° C. for 5 minutes, and obtain flame-resistant fiber. In FIG. 1, the spinning chimney 3 is shown with partial cutoff for the purpose of describing the inside.

With regard to the obtained flame-resistant fiber, the degree of fineness of single fiber was 2.0 dtex, the strength was 2.0 g/dtex and the ductility was 20%, and flame resistance was evaluated with single fiber, which was then found to be so red hot without burning as to have as excellent flame resistance as a carbonized length of 2 cm.

In addition, the flame-resistant fiber obtained from the flame-resistant polymer was preliminarily carbonized in nitrogen atmosphere at a temperature of 300 to 800° C., and subsequently carbonized in nitrogen atmosphere at a temperature of 1400° C. The strength of the obtained carbon fiber was 1600 MPa and the modulus of elasticity was 160 GPa.

Example 3

The flame-resistant polymer-containing solution of Example 1 was formed into a film by cast film forming method. Specific processes are as follows. First, the flame-resistant polymer-containing solution was cast on a glass plate with uniform thickness. The glass plate was dried in a constant-temperature dryer at a temperature of 100° C. for 5 minutes to once peel the obtained polymer off the glass plate. Thereafter, the glass plate was fixed to a metallic flask and treated in air atmosphere at a temperature of 300° C. for 5 minutes to thereby remove excessive solvent and volatile component, and obtain a flame-resistant film.

The final thickness of this flame-resistant film was found to measure 0.03 mm by a contact-type thickness meter. The break strength of the obtained flame-resistant film was 180 MPa and the ductility was 18%.

When flame resistance of this flame-resistant film was evaluated by the above-mentioned method, it was found that combustion did not continue despite slight ignition once and the shape was retained with a carbonized length of 2 cm after fire went out, so that flame resistance was excellent.

In addition, this flame-resistant film was preliminarily carbonized in nitrogen atmosphere at a temperature of 300 to 800° C., and subsequently carbonized in nitrogen atmosphere at a temperature of 1400° C. to thereby obtain a carbon film. The break strength of the obtained carbon film was 1200 MPa and the ductility was 1.5%.

Example 4

A surface of a stainless-steel plate was coated with the flame-resistant polymer-containing solution of Example 1, and put in an oven at a temperature of 100° C. to remove solvent and volatile component for 5 minutes, and further remove the remaining solvent and volatile component at a temperature of 300° C. for 5 minutes and fix a surface coating film having a thickness of 10 μm. Flame resistance of this molded product was evaluated by the same method as Example 3, and then found to be so excellent as to have no ignition and a carbonized length of 2 cm.

In addition, this molded product was preliminarily carbonized in inert atmosphere at a temperature of 300 to 800° C., and subsequently carbonized in inert atmosphere at a temperature of 900° C. to obtain a stainless-steel plate having a surface coating film consisting essentially of carbon.

Example 5

Copolymer fiber (the degree of fineness of single fiber was 0.9 dtex and the number of filaments was 3000) obtained from 99.5 mol % of acrylonitrile and 0.5 mol% of itaconic acid was subjected to air oxidation at a temperature of 240° C. for 100 minutes. Flame resistance of the obtained fiber was evaluated by the same method as Example 3, which fiber was then found to have so excellent flame resistance as to have no ignition and a carbonized length of 2 cm. 20 parts by weight of the flame-resistant fiber and 80 parts by weight of triethylenetetramine as solvent thereof were projected into a flask and heated to reflux while stirred for 2 hours to obtain a flame-resistant polymer-containing solution.

A very small amount of insoluble component was removed by hot filtration to thereafter manufacture a flame-resistant film by the same method as Example 3. Flame resistance of the obtained flame-resistant film was as excellent as a carbonized length of 3 cm.

Example 6

100 parts by weight of acrylonitrile, 0.6 parts by weight of itaconic acid, 371 parts by weight of dimethyl sulfoxide, 0.4 parts by weight of azobisisobutyronitrile and 1 part by weight of octylmercaptan were charged into a reaction vessel and nitrogen-substituted, and thereafter heated and polymerized at 65° C. for 5 hours and at 75° C. for 7 hours to prepare solution containing polyacrylonitrile copolymer (PAN) comprising 99.5 mol % of acrylonitrile having dimethylsulfoxide (DMSO) as solvent thereof and 0.5 mol % of itaconic acid. The whole system was decompressed to 30 hPa by exhaust with the use of a pump for removing monomer, and thereafter warmed up to 160° C., to which DMSO and monoethanolamine (MEA) were added and reacted in a uniform state for 60 minutes. Ortho-nitrotoluene (ONT) was further added and reacted at 160° C. for 120 minutes to obtain a black flame-resistant polymer-containing solution. The charge weight ratio on this occasion was PAN/DMSO/MEA/ONT=12/77/8/3.

The viscosity of the flame-resistant polymer-containing solution obtained by cooling was 300 Pa·s at a temperature of 25° C. and 100 Pa·s at a temperature of 50° C.

Figure 2:
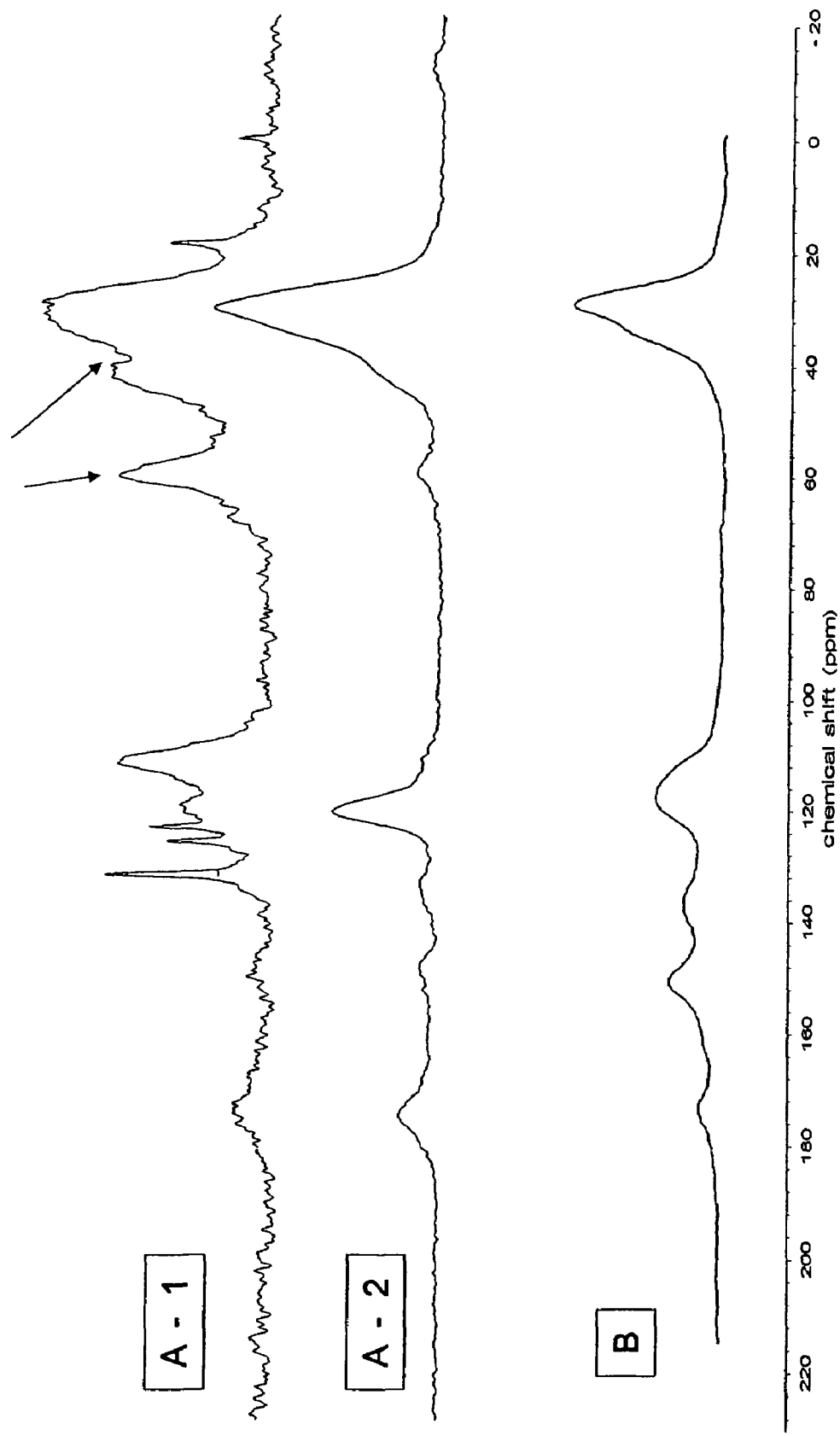
FIG. 2 is a solid NMR spectrum of a flame-resistant polymer denatured with amine obtained in Example 6 and flame-resistant fiber not denatured with amine obtained in Example 5.

The flame-resistant polymer was projected into warm water to separate coagulated polymer by filtration, which polymer was dried at a temperature of 120° C. to isolate the flame-resistant polymer. 13C-NMR analysis was performed in a solid state by DDMAS method and CPMAS method. A-1 of FIG. 2 is the spectrum by DDMAS method and A-2 is the spectrum by CPMAS method. B of FIG. 2 is the spectrum of the flame-resistant fiber with no amine denaturation obtained in Example 5. A peak derived from the flame-resistant polymer, which was not recognized in polyacrylonitrile as a precursor polymer, existed at chemical shift of 160 to 180 ppm in A-1 and A-2 of FIG. 2, and the spectrum by CPMAS method for measuring a portion of low molecular mobility was similar to that of the flame-resistant fiber with no amine denaturation. In DDMAS method for measuring a portion of high molecular mobility, a chemical bond peak of MEA used as an amine denaturant was recognized particularly obviously at 40 to 50 ppm and 58 to 68 ppm, so that it was found that MEA chemically modifies the flame-resistant polymer, which was taken in polymer backbone.

The concentration of the flame-resistant polymer in the flame-resistant polymer-containing solution was 18.5% by weight measured by the above-mentioned method. That is, polyacrylonitrile polymer concentration of 12% by weight became flame-resistant polymer concentration of 18.5% by weight by denaturation with monoethanolamine and the like, resulting in an increase to 1.54 times the amount of a precursor polymer.

When flame resistance of the flame-resistant polymer was evaluated in the same manner as Example 1, it was found that flaming time was as short as 8 seconds and a shape of nearly 100%-disk was retained, so that flame resistance was excellent.

Example 7

The flame-resistant polymer-containing solution of Example 6 was fibrillated by a wet spinning apparatus. Specifically, the flame-resistant polymer-containing solution was discharged from a mouthpiece having 100 holes with a diameter of 0.08 mm into a water bath at a temperature of 20° C. to substitute solvents with water, and thereafter the solution was passed through a roller at a roller rate of 10 m/minute and further washed to allow amine silicone oil solution thereto, and thereafter the solution was dried by heating with the use of a heated roll at a temperature of 180° C. and further drawn by 1.8 times at a temperature of 300° C. and simultaneously heat-treated to obtain flame-resistant fiber.

With regard to the obtained flame-resistant fiber, the degree of fineness of single fiber was 3.0 dtex, the strength was 2.5 g/dtex and the ductility was 18%, and flame resistance thereof was evaluated, which fiber was then found to be so red hot without burning as to have as excellent flame resistance as a carbonized length of 1 cm.

In addition, the flame-resistant fiber obtained from the flame-resistant polymer was preliminarily carbonized in nitrogen atmosphere at a temperature of 300 to 800° C., and subsequently carbonized in nitrogen atmosphere at a temperature of 1400° C. The strength of the obtained carbon fiber was 1800 MPa, the modulus of elasticity was 200 GPa and the specific gravity was 1.54.

The obtained carbon fiber was measured by wide-angle X-rays and then found to have a crystal size of 25Å and as much N content as 8% calculated from elemental analysis, which satisfied $[N \geq 0.04(Lc-30)^2 + 0.5]$.

Example 8

100 parts by weight of acrylonitrile, 371 parts by weight of dimethylsulfoxide, 0.4 parts by weight of azobisisobutyronitrile and 1.6 parts by weight of octylmercaptan were charged into a reaction vessel and nitrogen-substituted, and thereafter heated and polymerized at 65° C. for 5 hours and at 75° C. for 7 hours to prepare solution containing polyacrylonitrile (homo-PAN) comprising substantially 100% of acrylonitrile having dimethylsulfoxide (DMSO) as solvent thereof, which solution was subjected to removing monomer. DMSO and ONT were further added and warmed up to 150° C., to which monoethanolamine (MEA) were added and uniformly reacted for 60 minutes to obtain a flame-resistant polymer-containing solution. The charge weight ratio on this occasion was homo-PAN/DMSO/MEA/ONT=10/76/8/6.

The viscosity of the flame-resistant polymer-containing solution obtained by cooling was 50 Pa·s at a temperature of 25° C. and 30 Pa·s at a temperature of 50° C.

The flame-resistant polymer was projected into warm water to separate coagulated polymer by filtration, which polymer was dried at a temperature of 120° C. to isolate the flame-resistant polymer. When analyzed by 13C-NMR, a peak derived from the flame-resistant polymer, which was not recognized in polyacrylonitrile as a precursor polymer, solvents and denaturants, existed definitely at 160 to 180 ppm.

The concentration of the flame-resistant polymer in the flame-resistant polymer-containing solution was 13% by weight measured by the above-mentioned method. That is, polyacrylonitrile polymer concentration of 10% by weight became flame-resistant polymer concentration of 13% by weight by denaturation with monoethanolamine, resulting in an increase to 1.3 times the amount of a precursor polymer.

When flame resistance of the flame-resistant polymer was evaluated in the same manner as Example 1, it was found that flaming time was as short as 8 seconds and a shape of nearly 100%-disk was retained, so that flame resistance was excellent.

Example 9

The flame-resistant polymer-containing solution of Example 8 was fibrillated by a wet spinning apparatus. Specifically, the flame-resistant polymer-containing solution was discharged from a mouthpiece having 100 holes with a diameter of 0.08 mm into a water bath accommodating 20% by weight of DMSO at a temperature of 20° C. to substitute solvents with water, and thereafter the solution was passed through a roller at a roller rate of 10 m/minute, and further washed and dried by heating with the use of a heated roll at a temperature of 180° C., and further drawn by 1.5 times at a temperature of 300° C. and simultaneously heat-treated to obtain flame-resistant fiber.

With regard to the obtained flame-resistant fiber, the degree of fineness of single fiber was 1.6 dtex, the strength was 2.8 g/dtex and the ductility was 17%, and flame resistance was evaluated with single fiber, which was then found to be so red hot without burning as to have as excellent flame resistance as a carbonized length of 1 cm.

In addition, the flame-resistant fiber obtained from the flame-resistant polymer was preliminarily carbonized in nitrogen atmosphere at a temperature of 300 to 800° C., and subsequently carbonized in nitrogen atmosphere at a temperature of 1400° C. The strength of the obtained carbon fiber was 2000 MPa, the modulus of elasticity was 210 GPa and the specific gravity was 1.65.

The crystal size of the obtained carbon fiber was 24Å and the nitrogen content was 7.8% by weight, leading to the retainment of high crystal size and nitrogen content, which satisfied [$N \geq 0.04(Lc-30)^2+0.5$].

Comparative Example 1

A flame-resistant polymer-containing solution attempted to be obtained in the same manner as Example 5 except for modifying the solvent to nitric acid. Though the temperature was modified to a range of 50 to 300° C., the flame-resistant fiber could not sufficiently be dissolved, so that a flame-resistant polymer-containing solution could not be obtained.

INDUSTRIAL APPLICABILITY

A flame-resistant polymer of the present invention can widely be utilized as fire-resistant fiber products by forming into flake-resistant fiber. Flame-resistant fiber is carbonized and made into carbon fiber, which can widely be utilized as reinforced fiber of composite materials.

A flame-resistant polymer-containing solution can be used for all uses with flame resistance required by reason of being capable of forming into optional shapes such as sheets and molded products in addition to fiber. Flame-resistant products are easily made into carbon products, which are also useful for electrical parts and electronic parts.

What is claimed is:

1. A flame-resistant polymer that is soluble in a polar organic solvent and is denatured with an amine compound and made flame resistant with an oxidizing agent, wherein a precursor of the flame-resistant polymer is an acrylonitrile polymer.

2. A flame-resistant polymer-containing solution containing a flame-resistant polymer and a polar organic solvent, wherein the flame-resistant polymer is denatured with an amine compound and is obtained by using an acrylonitrile polymer as a precursor and made flame resistant with an oxidizing agent.

3. The flame-resistant polymer-containing solution according to claim 2, wherein the polar organic solvent is an amine organic solvent.

4. The flame-resistant polymer-containing, solution according to claim 2, wherein the polar organic solvent is an amine compound having two or more functional groups.

5. The flame-resistant polymer-containing solution according to claim 2, wherein a concentration of the flame-resistant polymer calculated by the following expression is 2 to 70% by weight:

(flame-resistant polymer concentration (% by weight))
=100×(flame-resistant polymer weight (g))/
(flame-resistant polymer-containing solution
weight (g))

where flame-resistant polymer weight indicates weight of solid component remaining in heating the flame-resistant polymer-containing solution in nitrogen at a rate of 50° C./minute up to 300° C.

6. A method for manufacturing a flame-resistant polymer-containing solution containing a flame-resistant polymer and a polar organic solvent, characterized by making a precursor of the flame-resistant polymer flame-resistant in an amine organic solvent or the polar organic solvent containing an amine compound and being made flame resistant with an oxidizing agent.

7. A method for manufacturing a flame-resistant polymer-containing solution containing a flame-resistant polymer and a polar organic solvent, characterized by dissolving the flame-resistant polymer in an amine organic solvent or the polar organic solvent containing an amine compound and made flame resistant with an oxidizing agent.

8. A flame-resistant formed product comprising a part or the whole thereof composed of a flame-resistant polymer that is soluble in a polar organic solvent and denatured with an amine compound and made flame resistant with an oxidizing agent, wherein a precursor of the flame-resistant polymer is an acrylonitrile polymer.

9. The flame-resistant formed product according to claim 8, being fibrous.

10. The flame-resistant formed product according to claim 8, being sheet and having a thickness of 5 mm or less.

11. A method for manufacturing a flame-resistant formed product comprising the steps of:

forming a flame-resistant polymer-containing solution, wherein a precursor of the flame-resistant polymer is an acrylonitrile polymer comprising a flame-resistant polymer and polar organic solvent which is made flame resistant with an oxidizing agent; and removing a solvent after said step.

12. The method for manufacturing a flame-resistant formed product according to claim 11, wherein said step of forming is the step of forming into being sheet.

13. The method for manufacturing a flame-resistant formed product according to claim 11, wherein said step of forming is the step of forming into being fibrous.

14. A method for manufacturing a carbon molded product, comprising carbonizing a flame-resistant formed product obtained by the method according to claim 11.

* * * * *